United States Patent [19]
Saari

[11] 4,002,440
[45] Jan. 11, 1977

[54] METHOD AND APPARATUS FOR OPERATING ON LIQUIDS AND GASES

[76] Inventor: Risto Saari, Harjula, 2440 Luoma, Finland

[22] Filed: Oct. 29, 1974

[21] Appl. No.: 518,873

[30] Foreign Application Priority Data
Oct. 29, 1973 Finland .............................. 3347/73

[52] U.S. Cl. ...................................... 55/25; 55/55; 55/190; 55/257 R; 261/76
[51] Int. Cl.² ........................................ B01D 47/06
[58] Field of Search .................. 55/25, 46, 55, 190, 55/257; 261/76

[56] References Cited
UNITED STATES PATENTS

| | | | |
|---|---|---|---|
| 885,301 | 4/1908 | Siepermann | 261/76 |
| 1,077,771 | 11/1913 | Waggoner | 261/76 |
| 1,401,101 | 12/1921 | Ehrhart | 55/46 |
| 2,006,985 | 7/1935 | Claude et al. | 55/55 |
| 3,154,087 | 10/1964 | Beaver | 55/55 X |
| 3,344,584 | 10/1967 | Kehoe et al. | 55/55 X |
| 3,358,425 | 12/1967 | Burnham, Sr. | 55/55 X |
| 3,486,297 | 12/1969 | Eisinga et al. | 55/25 X |
| 3,778,969 | 12/1973 | Sudduth | 55/55 |

*Primary Examiner*—John Adee
*Attorney, Agent, or Firm*—Steinberg & Blake

[57] ABSTRACT

A method and apparatus for operating on liquids and gases to perform operations such as altering the extent to which a gas is contained in a liquid and pumping a gas, by means of a liquid, from a lower pressure to a higher pressure. A liquid is drawn upwardly along a suction tube from a first body of the liquid to an elevation substantially higher than this first body so as to reduce the hydrostatic head of the liquid, and from the suction tube the liquid flows back down a delivery tube to a second body of the liquid, an ejector being provided at the upper end region of the delivery tube for increasing the velocity of flow of the liquid while further reducing the pressure thereof. At the ejector a gas is combined with the liquid to be pumped thereby from a lower to a higher pressure, or a gas at a relatively higher pressure than the liquid at the ejector is combined with this liquid at the ejector to be at least partly dissolved into the liquid. In addition, at the upper end region of the suction tube it is possible to introduce the liquid into a separating chamber where gas separates from the liquid, and this gas is then returned to the liquid flowing down the delivery tube, so that in this way a gas is separated from the liquid and pumped thereby out of the separating chamber.

19 Claims, 8 Drawing Figures

METHOD AND APPARATUS FOR OPERATING ON LIQUIDS AND GASES

BACKGROUND OF THE INVENTION

The present invention relates to methods and apparatus for operating on gases.

The present invention relates in particular to methods and apparatus for carrying out operations such as pumping gases, by means of a liquid, from a lower to a higher pressure, and operations such as altering the extent to which a gas is contained in a liquid.

It is already known to pump gas from a lower to a higher pressure by utilizing a liquid jet ejector, generally employed for such purposes as, for example, pumping gases from a vacuum to normal atmospheric pressure. A vacuum is generated by converting the pressure energy of the liquid into kinetic energy, and thereafter this kinetic energy is reconverted into pressure energy. In practice, when it is desired to achieve a substantial degree of vacuum, it is essential to utilize comparatively high water supply speeds. For example, in water jet ejectors by means of which air is pumped from a pressure of 30 mbar to a normal pressure, the water supply pressure is commonly higher than 300 kN/m² and the velocity of water flow in the nozzle is higher than 25 m/s. Inasmuch as even under these conditions the gas mass which is pumped remains comparatively small, on the order of $10^{-4}$ times the water quantity, the overall efficiency of ejectors of this type is undesirably low, being on the order of 5-8 per cent.

In connection with the extent to which a gas is contained in a liquid, the solubility of gases in liquids is known to behave according to Henry's law, according to which the solubility of a gas in a liquid is proportional to the gas pressure. Thus, if this pressure is reduced, the solubility of the gas decreases and the dissolved gas tends to separate from the liquid.

This latter phenomenon is utilized, for example, in the so-called vacuum deaeration process for separating air which is dissolved in water, and in this process the water is conducted into a tank under vacuum, so that the air separates from the water in the latter tank, and thereafter the air is pumped out of the tank by utilizing a vacuum pump. However, such vacuum pumps operate only with a relatively poor efficiency, and the gases are required to be pumped from relatively low pressures, so that comparatively high costs are involved in such processes.

It is well known that the dissolving of gases in liquids and the separation of gases therefrom usually involve a substantially irreversible process. This is true, for example, in the case of gases which are taken from air and dissolved in water. Separation of such gases from water at a relatively low pressure takes place much more readily than redissolving of such gases into the water. Thus, the relatively slow dissolving of gases in liquids causes difficulties where it is desired to carry out operations such as oxygenation of water. Conventional water oxygenation methods require a considerable excess of air bubbles to be pumped into the water, these air bubbles rising to the surface of the water. Operations of this latter type also involve high costs at the present time.

SUMMARY OF THE INVENTION

It is accordingly a primary object of the present invention to provide methods and apparatus, of the above general type, for operating on liquids and gases in such a way that operations of the type referred to above are considerably improved.

Thus, it is an object of the present invention to provide a method and apparatus according to which it is possible to pump a gas from a lower to a higher pressure while avoiding the high costs and inefficiencies inherent in known methods and apparatus which require the use of conventional ejectors as referred to above.

A further object of the present invention is to provide a method and apparatus for pumping gas from a lower to a higher pressure while utilizing a relatively small amount of liquid for this purpose.

It is furthermore an object of the present invention to provide a method and apparatus for separating a gas from a liquid without requiring the use of inefficient vacuum pumps and while avoiding the comparatively high costs presently required with conventional methods and apparatus.

It is also an object of the present invention to provide a method and apparatus for dissolving a gas into a liquid without requiring the pumping of a considerable excess of the gas into the liquid.

It is furthermore an object of the present invention to promote the dissolving of gases into liquids by providing methods and apparatus which make it possible to increase the time during which gas bubbles remain in the liquid.

It is furthermore an object of the present invention to provide a method and apparatus for operating on liquids and gases in such a way as to make the method and apparatus of the present invention particularly suitable for use in connection with vacuum distillation plants.

According to the present invention a flow path is provided for a liquid upwardly from a first body of the liquid and downwardly to a second body of the liquid while the liquid flows upwardly from the first body, located in a suitable tank, in a suitable suction tube means and downwardly to the second body of the liquid, also contained in a suitable tank means, while flowing downwardly through a suitable delivery tube means, these suction and delivery tube means being interconnected at their upper end regions by a connecting means which provides for the flow path a location where the liquid flows through a transfer region from the suction tube means to the delivery tube means. At this latter location of the flow path the liquid is subjected to the influence of at least one of a number of factors which include a predetermined hydrostatic head for the liquid or an increase in the flow velocity of the liquid, to provide for the liquid at the latter location of the flow path a relatively low pressure. A gas-combining means is provided for combining with the liquid at the latter location of relatively low pressure thereof a gas which is carried with the liquid downwardly along the delivery tube means. This gas combining means may be utilized for combining with the liquid a gas to be pumped thereby from a lower to a higher pressure. Also, at the above location of the flow path a gas may separate itself from the liquid and the gas-combining means will then combine this gas which has separated from the liquid itself with the liquid flowing down the delivery tube means, so that in this way gas can be separated from a liquid and pumped thereby without necessitating the use of inefficient vacuum pumps. In addition it is possible to combine with the liquid at the above location, by way of the gas-combining means, a gas which is at a pressure substantially higher than the liquid at the above location where the liquid has a relatively low pressure, so that this gas will become at least partly dissolved in the liquid as it flows down the delivery tube means.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
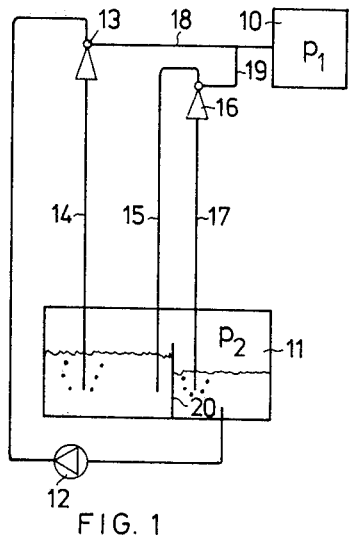
FIG. 1 is a schematic illustration of one method and apparatus of the present invention for pumping a gas from a low pressure space to a higher pressure space.

As has been pointed out above, conventional liquid jet ejectors operate only at an extremely low efficiency. It is possible to increase the efficiency of the pumping process by carrying out the greater part of the pumping work by means of a barometric water column. If gases are admixed to a liquid flowing downwardly in a flow duct which is closed at its top, these gases will travel in the form of bubbles downwardly along with the liquid into a region of higher pressure, and they will be isothermally compressed, so that an excellent pumping efficiency is achieved. An ejector may be placed in the column merely for admixing gas bubbles with the liquid, but its contribution to the pumping work is minor as compared with the contribution by the column itself.

In a pumping process of this latter type it is possible to use velocities of flow which are decidedly smaller than those utilized in conventional ejectors. However, it is possible in this case to admix with the liquid only a relatively small quantity of gas. It has been found experimentally that it is possible to admix to water having a flow velocity on the order of 1 m/s air which has approximately 20% of the water volume. This latter quantity represents only on the order of about 10% of the suction capacity of a conventional ejector. On the other hand, the kinetic energy of the water is only on the order of 0.2% of the energy in a conventional ejector.

With such a method and apparatus if pumping is performed only once, it is apparent that comparatively large quantities of water must be utilized. However if the same liquid is recirculated repeatedly for pumping gas, it is possible to achieve the desired results with a considerably smaller quantity of liquid. This operation is brought about in accordance with the invention by permitting gas bubbles to separate from the liquid while the latter is at a relatively high pressure, whereupon the liquid is again lifted up to a region of lower pressure and utilized for pumping additional gas.

Since the gas volume decreases with increasing pressure, the gas mass flow also increases so as to increase the capacity of the liquid to pump a considerable amount of gas. Thus, for example, if the gas is first pumped in the above manner to a pressure somewhat higher than its original pressure, it is then possible to pump the gas in one stage from the latter higher pressure to a still higher ultimate pressure with the very same quantity of liquid.

Thus, one of the important features of the present invention resides in pumping the gas, by means of a liquid, in such a way that the pressure of the liquid is varied, by providing a predetermined hydrostatic head therefor and by controlling the flow of velocity thereof, while gas is admixed as bubbles to the liquid while the pressure thereof is lower than the gas pressure, with the gas bubbles separating from the liquid when the latter has a pressure higher than the original gas pressure, and these operations are repeated a number of times so that at each stage or cycle the liquid can carry a new gas quantity from a lower to a higher pressure. Also in accordance with the invention gas is pumped in this way from its original low pressure to an intermediate higher pressure which is lower than the ultimate pressure, with the gas which accumulates at this intermediate pressure being further pumped to the ultimate pressure.

As has been pointed out above, in connection with the separation of gases from liquids, considerable inefficiencies are involved as a result of the use of conventional vacuum pumps. However in accordance with the present invention it is possible to separate gas from a liquid by reducing the pressure thereof so that the gas separates itself therefrom, and since it is much more difficult to redissolve the separated gas into the liquid, the liquid itself is utilized for pumping the gas which has become separated therefrom, thus eliminating the necessity for vacuum pumps.

In connection with the reverse situation where the slow dissolution of gases into liquids creates problems as, for example, in the case of oxygenation of water, it is possible in accordance with the present invention to repeatedly introduce into a liquid when it is at a region of low pressure a gas which has a substantially higher pressure than this latter low pressure, to be carried along with the liquid to a region of higher pressure so as to increase the time during which gas bubbles remain in the liquid and so as to enhance the dissolving of the gas into the liquid without the necessity of such conventional procedures as pumping into the liquid a considerable excess of gas bubbles which simply rise to the surface of the liquid into which the gas is pumped.

The above general considerations are illustrated, by way of example, in the drawings of the present application.

Thus, FIG. 1 illustrates the pumping of gas in a plurality of stages from a relatively low pressure $p_1$ to a higher pressure $p_2$. As may be seen from FIG. 1, the gas is derived from a source 10 in the form of a tank in which the gas is initially located at the low pressure $p_1$. This gas is pumped from this low pressure $p_1$ to a higher pressure $p_2$ in a tank 11, this tank 11 actually forming a pair of tank means inasmuch as the interior of the tank 11 is divided into a pair of separate spaces by a partition 20 on opposite sides of which are located two separate bodies of liquid. A pump 12 pumps liquid in the tank 11 from the body at the right of the partition 20 through a suitable tube up to the inlet end of an ejector 13 which sucks gas from the tank 10 through a pipe 18 so as to combine the gas from the tank 10 with the liquid which flows through the ejector 13 downwardly along the delivery pipe 14 to the second body of liquid on the left side of the partition 20 in FIG. 1. In this way a mixture of liquid and gas flows downwardly through the delivery pipe 14 into the tank 11 where the gas bubbles are compressed when the hydrostatic pressure increases to the pressure $p_1$. These gas bubbles rise to the surface of the liquid in the tank 11, and the liquid also rises along the interior of a suction tube means 15 from the region of the bottom of the tank at the left side of the partition 20 thereof up to an ejector means 16 which also draws gas from the source 10, at the pressure $p_1$, through a branch pipe 19, which communicates with the pipe 18, into the ejector 16. By way of the ejector 16 the mixture of gas and liquid is thus pumped at a second stage or cycle down through the delivery tube means 17 into the body of liquid situated in the tank 11 at the right side of the partition 20. It will be noted that the liquid levels in the pair of tank means situated at opposite sides of the partition 20 have heights which differ by an amount equivalent to the losses in the flow resistance formed by the pipe 15, ejector 16, and pipe 17. For the sake of simplicity FIG. 1 illustrates pumping of gas in only two stages, but it is to be understood that the number of stages may naturally be increased.

Thus, it will be seen that the tubes 15 and 17 and the connection therebetween at their upper end regions, where these tubes and their connection are completely closed off from the outer atmosphere, provide for the liquid a flow path according to which at the region of the upper ends of the tubes 15 and 17 the liquid is subjected to the influence of a relatively low hydrostatic head and an increase in velocity, resulting from the use of the ejector means 16, with the gas being combined with the liquid at the location of the transfer region where the liquid transfers from the tube 15 to the tube 17.

Of course, these same operations take place in the tube 14 and in the tube leading from the pump 12 to the ejector 13. Thus with the method and apparatus of FIG. 1, a pair of flow paths are provided for the liquid, one leading from the body of liquid from the right of the partition 20 through the pump 12 to the ejector 13 and from the latter through the pipe 14 to the body of liquid on the left side of the partition 20, while the second flow path provided by the pipes 15 and 17 returns the liquid from the second body to the first body, and thus the same liquid is repeatedly recirculated for carrying out the pumping of gas from the lower pressure $p_1$ to the higher pressure $p_2$, to avoid the necessity of the use of a large amount of liquid for this purpose. The pressure provided in the liquid by way of the hydrostatic head thereof and the increased velocity resulting from the use of the ejectors 13 and 16 is either equal to or lower than the pressure $p_1$ so that the gas will readily flow from the source 10 to the liquid to be carried along therewith to the interior of the tank 11 where the gas has the higher pressure $p_2$.

Figure 2:
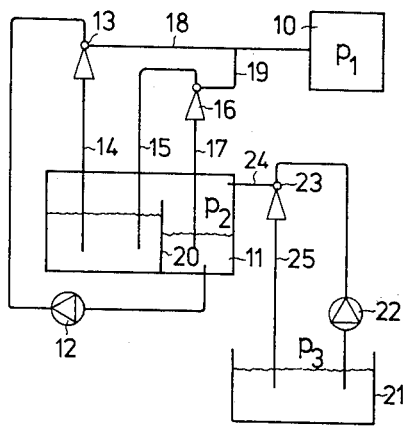
FIG. 2 illustrates a method and apparatus of the invention for adding to the method and apparatus of FIG. 1 a further pumping stage.

In the embodiment of FIG. 2 the gas is pumped with the liquid in the same way as described above and shown in FIG. 1. However in addition, from the intermediate pressure $p_2$ the gas is further pumped to the higher pressure $p_3$ which may be the normal atmospheric or ultimate pressure. For this purpose a third flow path is provided for liquid derived from an additional body of liquid situated in a separate tank 21. This additional flow path is provided by way of a pump 22 which pumps the liquid from the tank 21 upwardly through a suitable tube to a transfer region where the liquid transfers to an ejector 23 to be returned by a delivery tube 25 back to the additional body of liquid in the tank 21. A gas-combining means is provided by way of a tube 24 which communicates with the interior space of the tank 11, above the liquid therein, where the pressure $p_2$ prevails, and through this pipe 24 the gas is delivered from the interior of the tank 11 to the ejector 23 to be combined with the liquid at the ejector 23 where the liquid has a lower pressure resulting both from the relatively low hydrostatic head as well as the increased flow velocity. Thus through this simple expedient with the additional quantity of liquid in the tank 21, which is continuously recirculated, it is possible to pump the gas through an additional stage to the higher pressure. Thus, the gases are admixed in the ejector 23 to the liquid flowing therethrough in the form of bubbles which flow in the liquid column 25 to the tank 21 where the bubbles rise to the surface. It is also possible to pump from the intermediate pressure $p_2$ to the ultimate pressure $p_3$ by another method which may be a known method.

Figure 3:
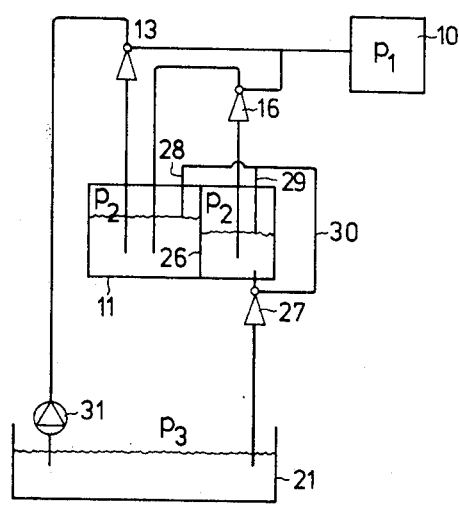
FIG. 3 is a schematic illustration of another embodiment of the invention for adding a third pumping stage to the method and apparatus of FIG. 1.

A particularly economical embodiment of the invention is illustrated in FIG. 3 where the pumping of the gas from the pressure $p_2$ to the pressure $p_3$ is carried out by utilizing the very same liquid used to pump the gas from the pressure $p_1$ to the pressure $p_2$. Thus, in the embodiment of FIG. 3 before the liquid is pumped from the right side of the partition 26, which corresponds to the partition 20, up to the ejector 13, the liquid first flows from the right side of the partition 26 downwardly through an ejector 27 into the additional tank 21 to form an additional body of liquid therein which is at the pressure $p_3$ and which is pumped by way of the pump 31 to the ejector 13. Thus in the embodiment of FIG. 3 the ejector 13 pumps, in the same way as the ejector 16, gas from the pressure $p_1$ to the pressure $p_2$. The ejector 27 communicates through pipe 30 and branches 28 and 29 thereof with the space in the tank 11 above the bodies of liquid on opposite sides of the partition 26. In this way the ejector 27 draws through the branches 28 and 29 and the pipe 30 gas from the space above the liquid in the tank 11. Thus, this gas which is thus drawn by the ejector 27 from the tank 11 is pumped to the higher pressure $p_3$. By precisely locating the bottom ends of the pipes 28 and 29 so that they have a predetermined elevation in the tank 11, it is possible to adjust the liquid levels of the bodies of liquid on opposite sides of the partition 26.

Inasmuch as the volume of gas at the pressure $p_2$ is less than at the pressure $p_1$, the ejector 27 is capable of pumping a larger gas quantity than the ejector 13 which pumps gas from the pressure $p_1$. If the pressure $p_2$ is twice as great as the pressure $p_1$, then the ejector 27 is capable of pumping the total gas quantity pumped by both of the preceding ejectors 13 and 16.

Figure 4:
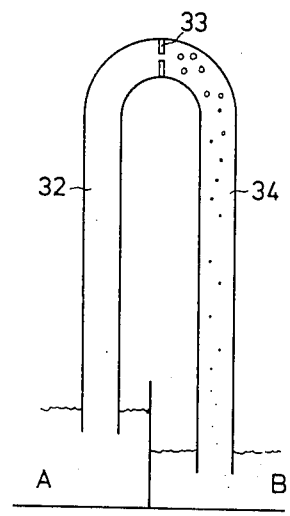
FIG. 4 is a schematic illustration of the method and apparatus of the invention for separating a gas from a liquid and pumping the separated gas with the liquid.

As was pointed out above, it is also possible in accordance with the invention to carry out operations in connection with the separation of a gas from a liquid. FIG. 4 illustrates one embodiment of the invention according to which gas dissolved in a liquid can be separated therefrom by the use of a vacuum and the flow velocity of the liquid. As may be seen from FIG. 4, the liquid flows from a body thereof situated in the tank A to a body of the liquid situated in the tank B by way of a siphon formed by the suction tube means 32 and the delivery tube means 34 interconnected by a U-shaped connecting means shown at the upper part of FIG. 4. Thus, by way of this arrangement the liquid is sucked upwardly along the tube 32 and is delivered downwardly along the tube 34, so as to flow from the tank A to the tank B. As the pressure of the liquid decreases at the upper part of the siphon, gases dissolved in the liquid separate therefrom and flow in the form of bubbles along with the liquid to the tank B. In this case a gas-combining means may be formed by way of a throttle 33, which may simply be a plate extending across the interior of the connecting means and formed with a suitable aperture so that by way of this throttling means the flow speed of the liquid on the right side of the throttle 33 is greatly increased to promote the separation of gas from the liquid in order to be carried along thereby as bubbles down into the tank B through the pipe 34. As was pointed out above in connection with Henry's law, while gases will separate readily from a liquid they will only combine therewith in a much slower manner, so that the embodiment of FIG. 4 takes advantage of this phenomenon in order to bring about both separation of gas from a liquid and pumping of the separated gas with the very same liquid from which it has been separated.

Figures 5, 6:
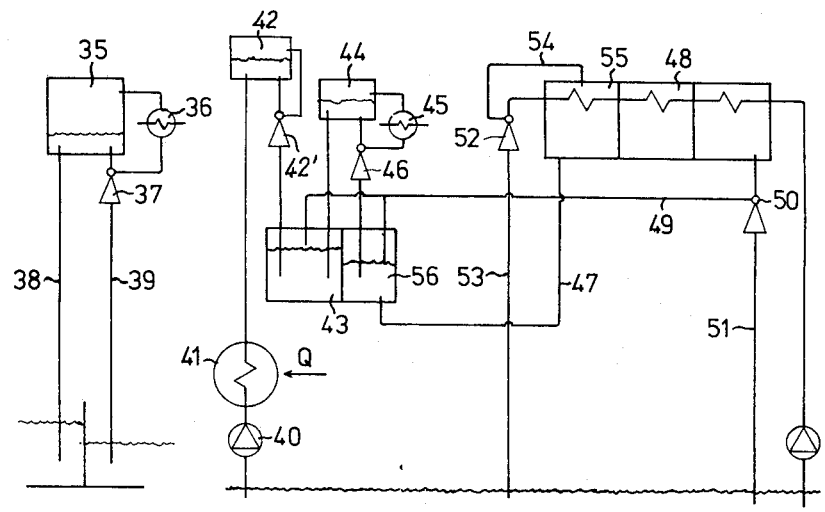
FIG. 5 shows schematically a further embodiment of a method and apparatus of the invention for separating a gas from a liquid and pumping the separated gas with the very same liquid from which it has been separated, FIG. 5 further illustrating how it is possible to condense vapors which flow with the gas.
FIG. 6 is a schematic illustration of the manner in which it is possible to utilize the method and apparatus of the invention in connection with operation of a vacuum distillation plant.

In the event that the separation of gas from the liquid takes place efficiently only at a pressure which is close to the vapor pressure of the liquid, then vapor will also separate in an abundant quantity along with the gas, thus reducing the ability of the liquid column to carry uncondensable gases along. The suction capacity of the column may in this case be substantially improved by an embodiment of the invention as illustrated in FIG. 5. The liquid which contains the gases flows upwardly along the suction tube 38 into a separating chamber means formed by a tank 35 which is closed off from the outer atmosphere and which communicates with the upper end region of the pipe 38. Thus, in the chamber 35 the gases and vapor will separate from the liquid, which accumulates at the bottom of the tank 35, so that the gases and vapor are situated in the tank 35 above the liquid therein. This liquid which accumulates at the bottom of the separating chamber 35 flows back down the delivery tube 39, with an ejector means 37 being operatively connected with the delivery tube 39 at the upper end region thereof just below the chamber 35. Thus, in this case the connecting means between the suction tube means 38 and the delivery tube means 39 is formed by the separating chamber 35 which provides with the tubes 38 and 39 the flow path illustrated in FIG. 5 from the body of liquid on the left side of the illustrated partition to the body of liquid on the right side thereof. The mixture of gas and vapor in the space above the liquid in the chamber 35 is drawn through a suitable conduit into the ejector 37 so that in this way the embodiment of FIG. 5 also has a gas-combining means for combining with the liquid flowing down the tube 38 a gas which has separated from the liquid. However, in the pipe which communicates with the space in chamber 35 above the liquid therein there is a condenser means 36 through which the gas and vapor flow before reaching the ejector 37. In the condenser means 36 the greatest part of the vapor condenses so as to provide a condensate which flows together with the gas to the ejector 37 to be combined with the liquid flowing down the pipe 39. In this way the proportion of uncondensable gases in the gas mixture to be admixed to the liquid substantially increases.

FIG. 6 illustrates how the invention may be utilized for the deaeration of the feedwater of a vacuum distillation plant. As is shown at the lower left portion of FIG. 6, a pump 40 draws water which is to be distilled through a heat exchanger 41 to which heat is delivered from any suitable source as indicated by the arrow Q. Thus, for example, the heat exchanger 41 may be in the form of the condenser of a power plant, and the liquid pumped by the pump 40 through the condenser cools fluid flowing around the tubes of the condenser while this liquid is heated and continues to flow upwardly beyond the condenser 41 to a separating chamber means 42 where part of the air dissolved in the water separates therefrom as bubbles with the resulting gas in the chamber 42 being combined at the ejector 42' with the liquid which returns to the tank 43. In the tank 43 these bubbles rise to the surface of the water. From the tank 43 the water is subjected to a second separating stage by being delivered to a second separating chamber 44 where once again part of the air is separated from the water together with water vapor. This vapor is condensed by a condenser means 45 corresponding to the condenser means 36 of FIG. 5 and condensate is drawn together with the separated air by way of the ejector 46 into a body of liquid in the tank 56 which is situated beside the tank 43. In the tank 56 the air again rises to the space above the liquid in this tank. This air separation may be repeated several times in this manner, if necessary.

From the tank 56 the water continues to flow through the pipe 47 into the first evaporator of a vacuum distillation plant 48 which is schematically illustrated, and the water delivered in this way to the plant 48 is distilled in a well known manner. The several evaporators of the distillation plant 48 include condensers 55, and from the first condenser 55 air flows through the pipe 54 to the ejector 52 in order to be discharged through the pipe 53 to the sea. The ejector 52 is supplied with water delivered through the coils of the condensers from the sea by the pump shown at the lower right of FIG. 6. Thus the cooling water of the condensers is utilized to flow through the ejector 52 in order to withdraw air from at least the first evaporator by way of the pipe 54.

The water which has been delivered to the plant 48 without being distilled therein is discharged back to the sea through an ejector 50 and the pipe 51. Thus any excess water at the last distillation stage is ejected through the ejector 50 and the pipe 51 back to the sea. Before reaching the ejector 50 the water has of course passed through the several evaporator stages. The ejector 50 communicates through a pipe 49 with the gas spaces in the tanks 43 and 56 above the liquid therein so that the air accumulating in the tanks 43 and 56 above the liquid therein is also discharged by way of the water flowing downwardly through the ejector 50 and the pipe 51.

Of course, the tanks 43 and 56 may be entirely separate from each other, so that, for example, the tank 43 may be placed at a considerably lower elevation than the tank 56 and the air separated in the separator 42 may be released in the tank 43 at normal pressure. If there are several separation stages corresponding to the air separator 44, the air accruing from them all in the tank 43 may be pumped out by way of the ejector 50.

Figures 7, 8:
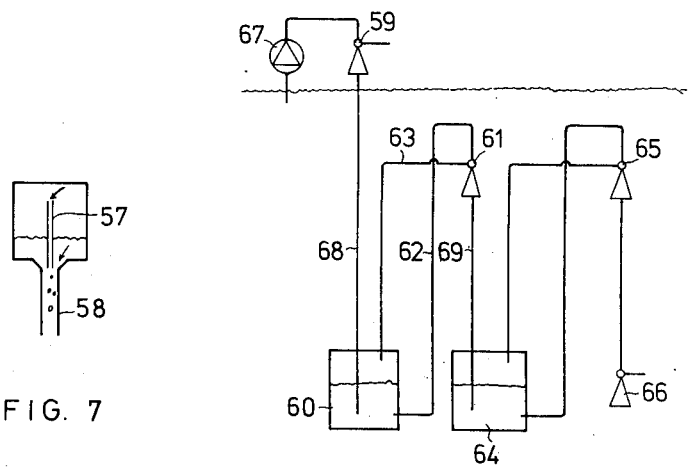
FIG. 7 is a schematic illustration of the manner in which an ejector means of the present invention operates.
FIG. 8 is a schematic illustration of a method and apparatus of the invention for dissolving a gas into a liquid.

It is to be noted that in the above description, and in the claims which follow, the term "ejector" has been repeatedly used, but in connection with the present invention it has a meaning slightly different from the usual meaning in that the flow velocity of the water in any of the ejectors of the invention is only on the order of 0.5-1 m/s. FIG. 7 illustrates an ejector design where the water flowing into the pipe 58 draws gases along in bubble form through the pipe 57 which leads into the mouth of the ejector.

As has been indicated above, the principles of the present invention may be utilized not only in connection with the pumping of gases and the separation of gases from a liquid, but also in connection with the dissolving of gases in liquids. For example, the present invention may be utilized for the oxygenation of water. An embodiment of the invention utilized for this purpose is illustrated in FIG. 8. As may be seen from FIG. 8, the pump 67 draws water to an ejector 59 which sucks air in to be fed along with the water from the ejector. This mixture of air and water flows downwardly along the pipe 68 into a tank 60. Part of the oxygen in the air will become dissolved into the water as it flows downwardly along the pipe 68.

From the tank 60 the water flows through a pipe 62 to an ejector 61 which is at a higher elevation, so that owing to this height differential the pressure of the water decreases. Thus the water is given a lower hydrostatic head and an increased velocity at the ejector 61 to have its pressure decreased. The air which accumulates in the tank 60 above the body of liquid therein, on the other hand, is delivered, by way of a gas combining means formed by the pipe 63, to the ejector 61. Thus the pipe 63 serves to deliver air from the space in the tank 60 above liquid therein to the ejector 61. This air in the tank 60 has when it reaches the ejector 61 the same pressure as that which prevails in the tank 60, so that the air is at a higher pressure than the liquid when it is admixed thereto at the ejector 61, and in this way extremely efficient readmixing of the air with the water takes place, and now the water flows downwardly through the pipe 69 with additional oxygen dissolved therein into the tank 64.

It is thus clear that the arrangement of FIG. 8 corresponds in all respects to an arrangement as shown for example for the pipes 15 and 17 of FIG. 1 or for the pipes 38 and 39 of FIG. 5, except that in the case of FIG. 8, instead of supplying to the ejector 61, which corresponds to the ejector 16, gas to be pumped from a lower to a higher pressure, or gas which has been separated from the liquid (as shown in FIG. 5), a gas is added to the liquid from a source of substantially higher pressure so that this higher pressure gas will become at least partly dissolved into the liquid while it flows downwardly into the second tank.

The above cycle taking place between the tanks 60 and 64 may be further repeated by way of an ejector 65, and finally by way of an ejector 66 additional oxygen-free water may be admixed with the water flowing from the ejector 65, and from the ejector 66 and the oxygenated water may be discharged into the ambient space.

It will be noted that with the embodiment of FIG. 8 the time during which the air bubbles are in the water is increased by causing these air bubbles to flow with the water downwardly along a pipe such as the pipe 69, so that an effective oxygenation of water may be provided without requiring pumping of excess air bubbles into the water.

What is claimed is:

1. In a method for operating on liquids and gases, the steps of providing for a liquid a flow path upwardly along the interior of a first tube from a first body of said liquid and downwardly along the interior of a second tube, which communicates with the first tube and which together with the first tube and a connection therebetween is closed off from the outer atmosphere, to a second body of said liquid, while maintaining a continuous flow of said liquid upwardly along the interior of said first tube, through said connection, and downwardly along the interior of said second tube, while subjecting the liquid, at a location of said flow path near to and including at said connection a transfer region where the liquid flows continuously from the first to the second tube, to the influence of at least one of two factors including a predetermined hydrostatic head and an increase in flow velocity, for reducing the liquid pressure at said location as compared to the liquid pressure at said bodies of said liquid, combining with the liquid at said location a gas to be conveyed with the liquid downwardly along the second tube, delivering the gas to the liquid at said location from a source where the gas is at a pressure at least as high as the pressure of the liquid at said location but less than the pressure of the liquid at said bodies of said liquid, so that the gas is pumped to the second body of said liquid where the gas has a higher pressure, providing for the liquid a second flow path, from one to the other of said bodies of liquid, substantially the same as said first-mentioned flow path, while subjecting the liquid at the said location of said second flow path to the influence of at least one of said factors, and delivering additional gas from said source to the liquid at said location of said second flow path, so that the pumping of the gas is carried out in a plurality of stages.

2. In a method as recited in claim 1 and wherein the liquid is pumped from the first body upwardly along said first tube before flowing downwardly along said second tube to said second body of said liquid, while said second flow path directs liquid from said second body back to said first body, so that said first and second bodies of liquid are used repeatedly for pumping gas.

3. In a method as recited in claim 2 and including the steps of pumping liquid upwardly from and back down to a third body of liquid along a third flow path substantially the same as said first and second flow paths while subjecting the liquid to the influence of at least one of said factors at said location of said third flow path, and combining with the liquid at said location of said third flow path gas which separates from the liquid at said second flow path after reaching said first body, so that the gas is pumped to a third higher pressure at said third body of liquid.

4. In a method as recited in claim 2 and including the step of pumping the liquid from the first body of liquid upwardly along the first tube while intially delivering the liquid to a third body from the first body with liquid from the third body being pumped upwardly along said first tube, and delivering to the liquid flowing from the first to the third body gas situated above the first and second bodies of liquid, for pumping the gas to a third higher pressure.

5. In a method as recited in claim 1 and including the step of directing the liquid at said location downwardly through an ejector at an upper part of said second tube while providing for the liquid as it flows through the ejector a velocity on the order of 0.5–1 m/s, and combining the gas with the liquid at said ejector.

6. In a method for operating on liquids and gases, the steps of providing for a liquid a flow path upwardly along the interior of a first tube from a first body of said liquid and downwardly along the interior of a second tube, which communicates with the first tube and which together with the first tube and a connection therebetween is closed off from the outer atmosphere, to a second body of said liquid, while maintaining a continuous flow of said liquid upwardly along the interior of said first tube, through said connection, and downwardly along the interior of said second tube, while subjecting the liquid, at a location of said flow path near to and including at said connection a transfer region where the liquid flows continuously from the first to the second tube, to the influence of at least one of two factors including a predetermined hydrostatic head and an increase in flow velocity, for reducing the liquid pressure at said location as compared to the liquid pressure at said bodies of said liquid, combining with the liquid at said location a gas to be conveyed with the liquid downwardly along the second tube, the gas initially being in the liquid as it flows upwardly along said first tube and at least partly separates from the liquid at said location, and including the step of combining the thus-separated gas with the liquid at said location so that the liquid carries downwardly to the second body of said liquid gas which has been separated from the liquid at said location.

7. In a method as recited in claim 6 and including the step of throttling the flow of liquid at said transfer region for increasing the speed of flow of the liquid and enhancing the separation of gas from the liquid.

8. In a method as recited in claim 6 and including the step of delivering the liquid from the first tube into a separating chamber at said location where the gas separates from the liquid to be situated above the latter in the separating chamber, and then directing the gas from above the liquid in the separating chamber to the liquid flowing downwardly along the second tube to be carried with the liquid to the second body of said liquid.

9. In a method as recited in claim 8 and including the step of condensing from the gas, directed from said chamber above the liquid therein to the liquid flowing out of said chamber, vapors which are present in the gas, as the gas flows from the gas space in said chamber to the liquid flowing downwardly along the second tube, to provide a condensate, and combining both the condensate and the gas from said chamber with the liquid flowing downwardly along said second tube.

10. In a method as recited in claim 8 and including the steps of delivering the liquid from the second body of said liquid to an evaporator of a vacuum distillation plant where additional gas separates from the liquid in said evaporator, and pumping the latter separated gas out of the evaporator with liquid flowing through a condenser in said evaporator.

11. In a method as recited in claim 8 and including the steps of delivering liquid from said second body of liquid to evaporators of a vacuum distillation plant, discharging at least some of the latter liquid from said evaporators, and pumping gas from a space above said second body of said liquid out of the latter space with the liquid discharging from said evaporators.

12. In a method for operating on liquids and gases, the steps of providing for a liquid a flow path upwardly along the interior of a first tube from a first body of said liquid and downwardly along the interior of a second tube, which communicates with the first tube and which together with the first tube and a connection therebetween is closed off from the outer atmosphere, to a second body of said liquid, while maintaining a continuous flow of said liquid upwardly along the interior of said first tube, through said connection, and downwardly along the interior of said second tube, while subjecting the liquid, at a location of said flow path near to and including at said connection a transfer region where the liquid flows continuously from the first to the second tube, to the influence of at least one of two factors including a predetermined hydrostatic head and an increase in flow velocity, for reducing the liquid pressure at said location as compared to the liquid pressure at said bodies of said liquid, combining with the liquid at said location a gas to be conveyed with the liquid downwardly along the second tube, delivering the gas to the liquid at said location from a source where the gas has a higher pressure than the liquid at said location so that the gas becomes at least partly dissolved into the liquid as the latter flows downwardly to the second body of said liquid, said source being a gas space above said first body of said liquid.

13. In an apparatus for operating on liquids and gases, a pair of tank means for respectively containing bodies of liquid, suction tube means communicating with the interior of and extending upwardly from one of said tank means for drawing a liquid therefrom upwardly to an elevation substantially higher than said one tank means, delivery tube means communicating with the interior of and extending downwardly to the other of said tank means for delivering liquid to the interior of said other tank means, connecting means connecting both of said tube means at upper end regions thereof for providing communication between both of said tube means at said upper end regions thereof and for maintaining a continuous flow of liquid upwardly through said suction tube means, through said connecting means, and downwardly through said delivery tube means, said pair of tank means cooperating with said suction tube means and said delivery tube means and both of the latter tube means cooperating with said connecting means for providing for the liquid during continuous flow thereof a flow path which is closed off from the outer atmosphere, so that the liquid will flow continuously while closed off from the outer atmosphere upwardly through said suction tube means, through said connecting means, and downwardly through said delivery tube means from said one to said other tank means, and gas-combining means communicating with said delivery tube means at said upper end region thereof for combining a gas with the liquid flowing down said delivery tube means to said other tank means, an ejector means operatively connected with said delivery tube means at said upper end region thereof for increasing velocity of flow of the liquid returning through said delivery tube means to said other tank means, and said gas-combining means feeding a gas to said ejector means to be combined at the latter with the liquid flowing downwardly along said delivery tube means, said connecting means being a separating chamber in which gas separates from liquid delivered to said separating chamber by said suction tube means to be situated in said separating chamber above the liquid therein, the liquid flowing from the separation chamber downwardly along said delivery tube means through said ejector means, and said gas-combining means communicating with the interior of said separating chamber at the space above the liquid therein for delivering the gas separated from the liquid in said separating chamber to said ejector means.

14. The combination of claim 13 and including a vacuum distillation plant having evaporator means, and a pipe connected between and communicating with liquid in said other tank means and with said evaporator means of said distillation plant for delivering liquid from said other tank means to said evaporator means of said distillation plant.

15. The combination of claim 14 and wherein said evaporator means includes a condenser having liquid flowing therethrough with gas separating in said evaporator means from liquid delivered thereto by said pipe, and means communicating with said evaporator means for pumping the gas separated therein out of the latter with the liquid which flows through the condenser means.

16. The combination of claim 14 and wherein a means communicates with said evaporator means for pumping out of the latter some of the liquid delivered thereto by said pipe from said other tank means, and a further pipe providing communication between gas above the liquid in said other tank means and said means for pumping the liquid out of said evaporator means so that the latter gas from said other tank means is pumped out of the latter together with the liquid from said evaporator means.

17. In an apparatus for operating on liquid and gases, a pair of tank means for respectively containing bodies of liquid, suction tube means communicating with the interior of and extending upwardly from one of said tank means for drawing a liquid therefrom upwardly to an elevation substantially higher than said one tank means, delivery tube means communicating with the interior of and extending downwardly to the other of said tank means for delivering liquid to the interior of said other tank means, connecting means connecting both of said tube means at upper end regions thereof for providing communication between both of said tube means at said upper end regions thereof and for maintaining a continuous flow of liquid upwardly through said suction tube means, through said connecting means, and downwardly through said delivery tube means, said pair of tank means cooperating with said suction tube means and said delivery tube means and both of the latter tube means cooperating with said connecting means for providing for the liquid during continuous flow thereof a flow path which is closed off from the outer atmosphere, so that the liquid will flow continuously while closed off from the outer atmosphere upwardly through said suction tube means, through said connecting means, and downwardly through said delivery tube means from said one to said other tank means, and gas-combining means communicating with said delivery tube means at said upper end region thereof for combining a gas with the liquid flowing down said delivery tube means to said other tank means, said suction and delivery tube means and said connecting means therebetween forming a siphon, and said gas-combining means being a throttling means situated in said connecting means for throttling the flow of liquid through said connecting means from said suction tube means to said delivery tube means to provide downstream of said throttling means an increased liquid velocity which enhances separation of gas from the liquid to be combined therewith when flowing downwardly along said delivery tube means to said other tank means.

18. In an apparatus for operating on liquids and gases, a pair of tank means for respectively containing bodies of liquid, suction tube means communicating with the interior of and extending upwardly from one of said tank means for drawing a liquid therefrom upwardly to an elevation substantially higher than said one tank means, delivery tube means communicating with the interior of and extending downwardly to the other of said tank means for delivering liquid to the interior of said other tank means, connecting means connecting both of said tube means at upper end regions thereof for providing communication between both of said tube means at said upper end regions thereof and for maintaining a continuous flow of liquid upwardly through said suction tube means, through said connecting means, and downwardly through said delivery tube means, said pair of tank means cooperating with said suction tube means and said delivery tube means and both of the latter tube means cooperating with said connecting means for providing for the liquid during continuous flow thereof a flow path which is closed off from the outer atmosphere, so that the liquid will flow continuously while closed off from the outer atmosphere upwardly through said suction tube means, through said connecting means, and downwardly through said delivery tube means from said one to said other tank means, and gas-combining means communicating with said delivery tube means at said upper end region thereof for combining a gas with the liquid flowing down said delivery tube means to said other tank means, both of said tank means enclosing therein gas spaces above liquids therein, and said gas-combining means including a tube communicating with the gas space in said one tank means and with said ejector means for delivering gas from said space of said one tank means to said ejector means to be at least partly dissolved into liquid delivered by said delivery tube means to said other tank means.

19. In an apparatus for operating on liquids and gases, a pair of tank means for respectively containng bodies of liquid, suction tube means communicating with the interior of and extending upwardly from one of said tank means for drawing a liquid therefrom upwardly to an elevation substantially higher than said one tank means, delivery tube means communicating with the interior of and extending downwardly to the other of said tank means for delivering liquid to the interior of said other tank means, connecting means connecting both of said tube means at upper end regions thereof for providing communication between both of said tube means at said upper end regions thereof and for maintaining a continuous flow of liquid upwardly through said suction tube means, through said connecting means, and downwardly through said delivery tube means, said pair of tank means cooperating with said suction tube means and said delivery tube means and both of the latter tube means cooperating with said connecting means for providing for the liquid during continuous flow thereof a flow path which is closed off from the outer atmosphere, so that the liquid will flow continuously while closed off from the outer atmosphere upwardly through said suction tube means, through said connecting means, and downwardly through said delivery tube means from said one to said other tank means, and gas-combining means communicating with said delivery tube means at said upper end region thereof for combining a gas with the liquid flowing down said delivery tube means to said other tank means, a second delivery tube means communicating with the interior of said one tank means for delivering liquid thereto, ejector means operatively connected with an upper end region of said second delivery tube means, for increasing the speed with which liquid flows downwardly therealong to said one tank means, said gas-combining means including a source of gas at a pressure at least as high as the pressure of the liquid in both of said delivery tube means at said upper end regions thereof but less than the pressure of gas in both of said tank means above liquid therein, said source communicating with both of said ejector means, and pump means communicating with said other tank means and with said upper end region of said second delivery tube means for pumping liquid from said other tank means to said ejector means of said second delivery tube means, whereby gas is pumped in two stages from said source to the interior of both of said tank means while the liquid used for pumping the gas is recirculated.

* * * * *